United States Patent
Candido De Lima Junior et al.

(10) Patent No.: US 11,513,970 B2
(45) Date of Patent: Nov. 29, 2022

(54) SPLIT VIRTUAL MEMORY ADDRESS LOADING MECHANISM

(71) Applicant: International Business Machines Corporation, Armonk, NY (US)

(72) Inventors: Juscelino Candido De Lima Junior, Sao Paulo (BR); Breno H. Leitao, Araraquara (BR); Carlos Eduardo Seo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/671,365

(22) Filed: Nov. 1, 2019

(65) Prior Publication Data
US 2021/0133113 A1   May 6, 2021

(51) Int. Cl.
| | | |
|---|---|---|
| G06F 12/00 | (2006.01) | |
| G06F 12/1009 | (2016.01) | |
| G06F 11/14 | (2006.01) | |
| G06F 12/06 | (2006.01) | |

(52) U.S. Cl.
CPC ...... *G06F 12/1009* (2013.01); *G06F 11/1456* (2013.01); *G06F 12/0638* (2013.01); *G06F 2201/80* (2013.01)

(58) Field of Classification Search
CPC ............ G06F 12/1009; G06F 12/0638; G06F 11/1456; G06F 2201/80
See application file for complete search history.

(56) References Cited

U.S. PATENT DOCUMENTS

| | | |
|---|---|---|
| 5,873,120 A | 2/1999 | Harvey |
| 6,125,430 A | 9/2000 | Noel |
| 8,515,075 B1* | 8/2013 | Saraf ..................... G06F 21/566 380/277 |
| 9,535,828 B1 | 1/2017 | Mckelvie |
| 10,025,508 B2 | 7/2018 | Chinnakkonda Vidyapoornachary |
| 2008/0052711 A1 | 2/2008 | Forin |
| 2012/0072658 A1* | 3/2012 | Hashimoto ........... G06F 9/4418 711/104 |
| 2013/0326206 A1* | 12/2013 | Lueck ..................... G06F 1/32 713/2 |
| 2015/0249618 A1* | 9/2015 | Golander .............. H04L 67/104 709/224 |
| 2016/0342487 A1 | 11/2016 | Ware |
| 2016/0378344 A1* | 12/2016 | Nachimuthu ......... G06F 9/4403 711/103 |
| 2017/0147490 A1 | 5/2017 | Arafa |

(Continued)

OTHER PUBLICATIONS

Handy, Jim, "Why Are NVDIMMS Suddenly Hot", Feb. 14, 2018, electronicdesign.com, 10 pages,<https://www.electronicdesign.com/industrial-automation/why-are-nvdimms-suddenly-hot>.

(Continued)

*Primary Examiner* — Craig S Goldschmidt
(74) *Attorney, Agent, or Firm* — Stephen R. Yoder (57) ABSTRACT

Virtual memory address space is divided according to areas of the virtual memory address and allocating some areas to low-cost volatile memory (such as RAM) when the memory areas are not required by an application to be stored in non-volatile memory, such as NVDIMM. A loader mechanism creates and maintains a layout address table in non-volatile memory for recovery from an unexpected reset.

8 Claims, 5 Drawing Sheets

(56) References Cited

U.S. PATENT DOCUMENTS

2017/0338213 A1    11/2017  Lalam
2019/0303028 A1*  10/2019  Rawal .................. G06F 3/0673

OTHER PUBLICATIONS

Zhang et al., "Fast Persistent Heap Based on Non-Volatile Memory", Copyright © 2017 The Institute of Electronics, Information and Communication Engineers, 11 pages.

* cited by examiner

SPLIT VIRTUAL MEMORY ADDRESS LOADING MECHANISM

BACKGROUND

The present invention relates generally to the field of virtual memory, and more particularly to managing virtual memory for a power out condition.

A non-volatile dual in-line memory module (NVDIMM) is a type of random-access memory (RAM) for computers. Non-volatile memory is memory that retains its contents even when electrical power is removed, for example from an unexpected power loss, system crash, or normal shutdown. The term "dual in-line" indicates that the memory uses the DIMM package, which is a series of dynamic random-access memory (DRAM) integrated circuits. Non-volatile storage products, such as the NVDIMM, may use volatile memory storage during normal computer operation and dump the storage contents into non-volatile memory when the power fails by using an on-board backup power source.

Dynamic random-access memory (DRAM) is a type of RAM that stores each bit of data in a separate tiny capacitor within an integrated circuit. The capacitor has two possible states, charged or discharged. These two states are taken to represent the two values of a bit referred to as 0 and 1. The electric charge on a capacitor slowly leaks off such that without refreshing the memory, the capacitor state would be lost. To prevent losing states, DRAM requires an external memory refresh circuit that periodically rewrites the data in the capacitors, restoring them to their original charges. It is the refresh process that defines dynamic random-access memory. Unlike flash memory, DRAM is volatile memory because it loses its data quickly when power is removed.

Process virtual address space (VAS), also referred to as address space, is the set of ranges of virtual addresses that an operating system makes available to a process as its environment. The range of virtual memory addresses usually starts at a low address and can extend to the highest address allowed by the corresponding instruction set architecture.

SUMMARY

In one aspect of the present invention, a method, a computer program product, and a system for managing virtual address space includes: (i) establishing a layout address table in a non-volatile memory of a computing storage space; (ii) determining an allocation scheme for memory segments required by a process, the allocation scheme based on memory classification; (iii) assigning a first classification to a first memory segment; (iv) allocating the first memory segment to a volatile memory of the computing storage space; (v) updating the layout address table to associate the first memory segment with the volatile memory; and (vi) recording data to the first memory segment at execution of the process through a page fault.

DETAILED DESCRIPTION

Virtual memory address space is divided according to areas of the virtual memory address and allocating some areas to low-cost volatile memory (such as RAM) when the memory areas are not required by an application to be stored in non-volatile memory, such as NVDIMM. A loader mechanism creates and maintains a layout address table in non-volatile memory for recovery from an unexpected reset. An unexpected reset may be referred to as a reset condition. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
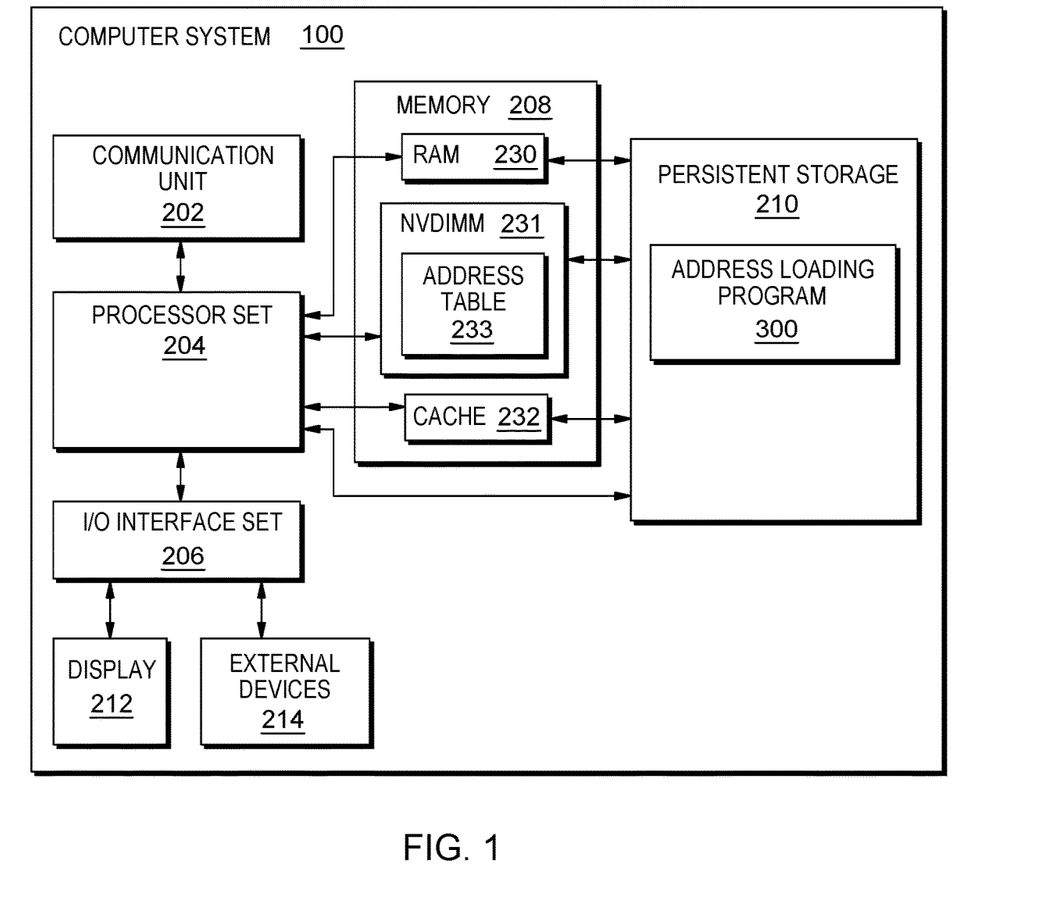
FIG. 1 is a schematic view of a first embodiment of a system according to the present invention.

The present invention will now be described in detail with reference to the Figures. FIG. 1 is a functional block diagram illustrating various portions of computer system 100, in accordance with one embodiment of the present invention, including: communication unit 202; processor set 204; input/output (I/O) interface set 206; memory device 208; persistent storage device 210; display device 212; external device set 214; random access memory (RAM) devices 230; non-volatile DIMM devices 231; layout address table 233; cache memory device 232; and address loading program 300.

Computer system 100 may be a laptop computer, tablet computer, netbook computer, personal computer (PC), a desktop computer, a personal digital assistant (PDA), a smart phone, and/or any programmable electronic device now know or to be known in the future. Program 300 is a collection of machine readable instructions and/or data that is used to create, manage, and control certain software functions that will be discussed in detail below.

Computer system 100 is shown as a block diagram with many double arrows. These double arrows (no separate reference numerals) represent a communications fabric, which provides communications between various components of computer system 100. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to computer system 100 may be able to provide memory for computer system 100.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to computer system 100. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer system 100. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
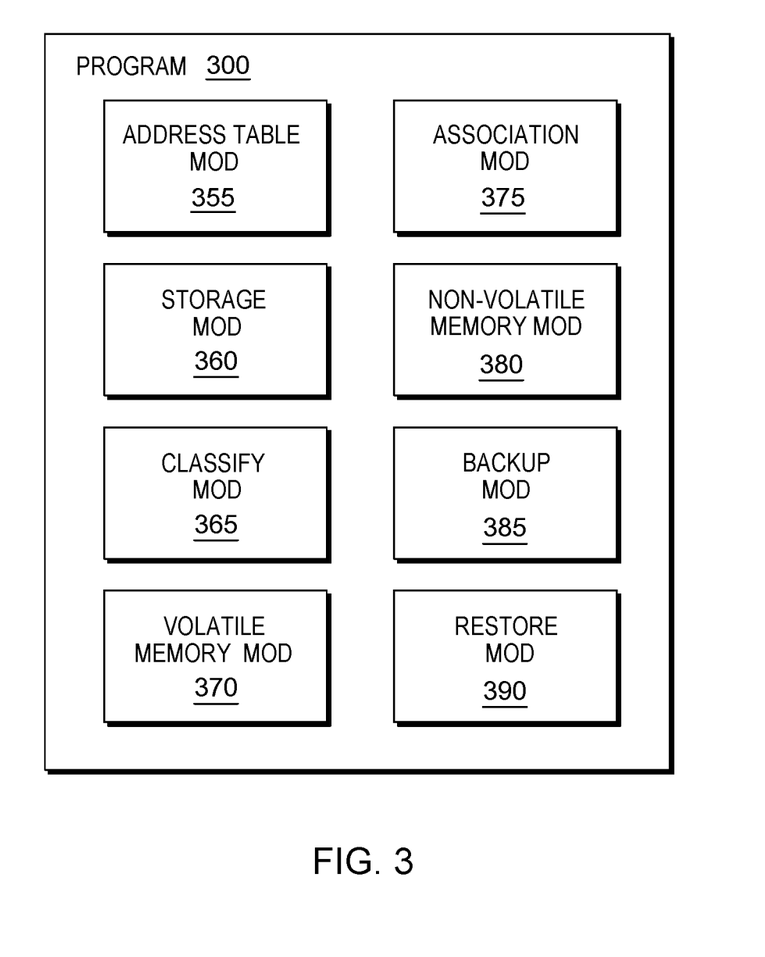
FIG. 3 is a schematic view of a machine logic (for example, software) portion of the first embodiment system.

Address loading Program 300 operates to establish a layout address table for tracking memory allocation according to a divided virtual address space. The address space is divided into memory segments where the segments are classified according to pre-defined types of storage. Each segment is stored according to the classification and the layout address table is updated for future actions, such as a restore process responsive to an unexpected reset.

Some embodiments of the present invention recognize the following facts, potential problems and/or potential areas for improvement with respect to the current state of the art: (i) The NVDIMM exists to leverage the speed of the DRAM bus and of memory accesses; (ii) Conventionally, the NVDIMM has been used exclusively for the processor to communicate with DRAM; (iii) the potential loss of storage contents by DRAM at power failure is why computers need persistent storage; (iv) a conventional way to make a NVDIMM persistent is to keep the data stored by the NVDIMM in DRAM, just like any standard DIMM, and add a NAND flash memory chip to copy the contents of the DRAM when power fails; (v) according to the current state of the art an application runs faster on RAM instead of NVDIMM; (vi) the RAM memory channel is the fastest bus in a typical computer system; (vii) memory modules and DIMMs plug into the DRAM bus; and/or (viii) persistent storage is where the computer keeps bits in the event of a power loss.

Some embodiments of the present invention combine the benefits of non-volatile memory and low cost of volatile memory, by splitting areas of the virtual memory address and allocating the areas of the virtual memory that do not require higher-cost non-volatile memory into lower-cost volatile memory (such as RAM).

Process virtual address space may be composed of memory segments of types including, but not limited to: text memory, data memory, heap memory, stack memory, shared (SHM) memory, debug memory, and/or immutable content memory. Conventionally, the virtual memory area, sometimes referred to as the VMA, is loaded within NVDIMM. According to some embodiments of the present invention, the text memory section of the virtual memory area is loaded into volatile memory while the data memory, heap memory, and stack memory sections are loaded into NVDIMM. In that way, a same level of reliability is achieved compared to the conventional approach while reducing use of the more costly NVDIMM memory.

Some embodiments of the present invention introduce a non-uniform memory access process such that data access has a different latency than instructions access with the data memory being stored in non-volatile memory space.

Figure 2:
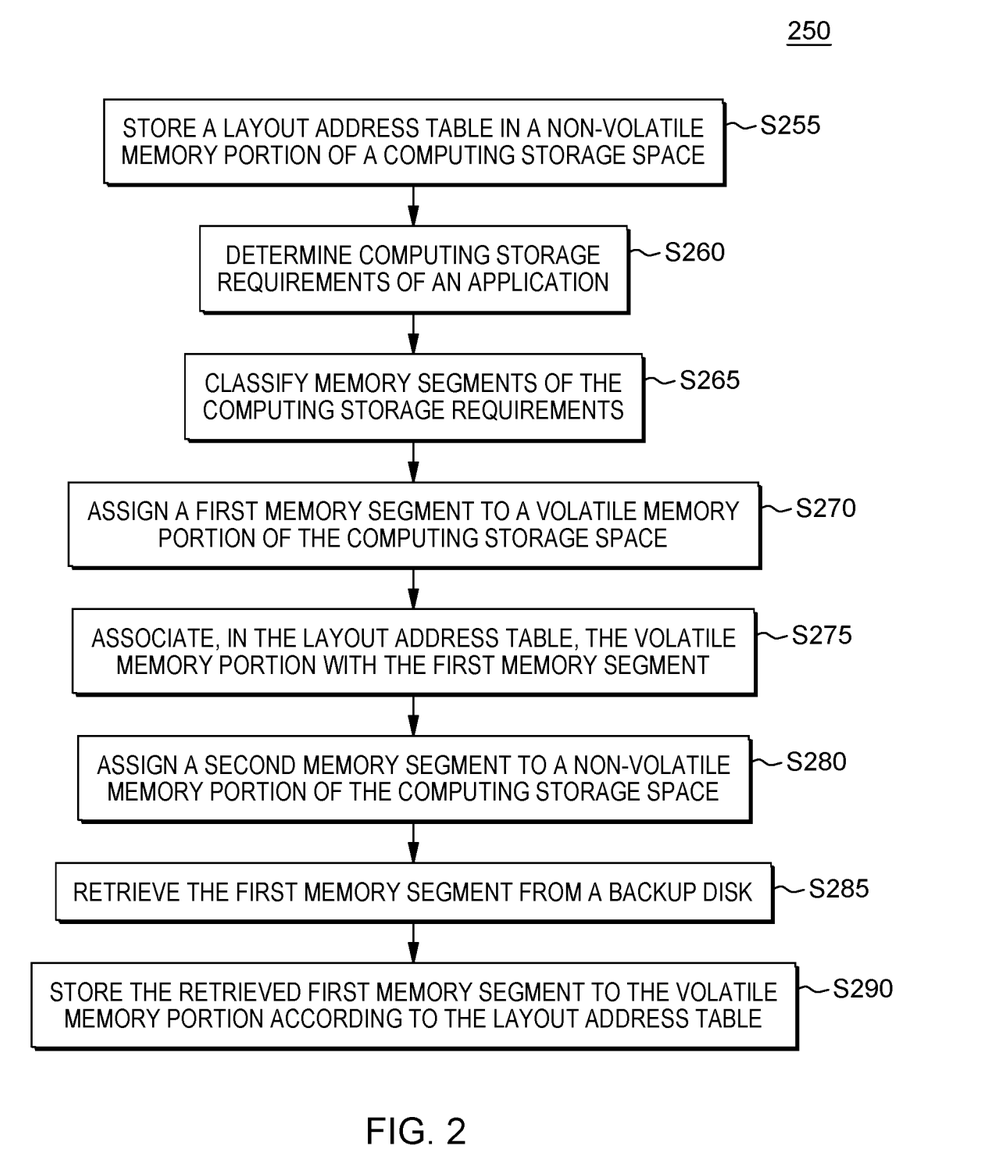
FIG. 2 is a flowchart showing a method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where address table module ("mod") 355 stores a layout address table in a non-volatile memory portion of a computing storage space. In this example, address table 233 is stored in NVDIMM 231 of computer system 100 (See FIG. 1). In some embodiments of the present invention, the layout address table is created for storage in the non-volatile memory portion of a computing storage space. The layout address table serves to maintain the various locations of the divided memory segments because an application may have been started using address space layout randomization (ASLR), which is remapped if the virtual memory address is reconstructed.

Processing proceeds to step S260, where storage mod 360 determines computing storage requirements of an application. Each application has particular storage requirements for operation. Storage requirements include, but are not limited to: text memory, data memory, heap memory, stack memory, shared (SHM) memory, debug memory, and/or immutable content memory. According to some embodiments of the present invention, process VMS is allocated according to the determined computing storage requirements.

Processing proceeds to step S265, where classify mod 365 classifies memory segments of the computer storage requirements. Specific memory segments may be pre-defined by the particular loader mechanism deployed in the computing system. In this example, memory segments are classified according to Docker classification. Alternatively, another loader mechanism is referenced in classifying the memory segments. Allocation of the memory segments is based on the classification of the memory segment. According to some embodiments of the present invention, those memory segments that are allocated to volatile memory are also backed up to disk.

Processing proceeds to step S270, where volatile memory mod 370 assigns a first memory segment of the classified memory segments to a volatile memory portion of the computing storage space. Assignment of the first memory segment is performed on the basis of the classification of the first memory segment. In this example, a memory segment classified as text is assigned to the volatile memory.

Processing proceeds to step S275, where association mod 375 associates, in the layout address table, the volatile memory portion of the storage space with the first memory segment having a first classification. As memory segments are assigned to memory portions according to their classifications, the layout address table is updated to associate the segments with the corresponding memory portions, such as the non-volatile and volatile portions. As stated earlier, data stored in memory segments associated with volatile memory may be recorded to a backup disk.

Processing proceeds to step S280, where non-volatile memory mod 380 assigns a second memory segment of the memory segments having a second classification to a non-volatile memory portion of the computing storage space. In this example, the memory segment classified as data is loaded into non-volatile memory. Data memory will be loaded or recorded through a page fault that will cause a write to the destination memory, but only at execution.

Processing proceeds to step S285, where backup mod 385 retrieves the first memory segment from a backup disk. Responsive to an unexpected reset or other recovery activity, the first memory segment is retrieved from a backup disk for restoration. It should be noted that other memory segments stored in NVDIMM are not lost during a reset condition.

Processing ends with step S290, where restore mod 390 stores the retrieved first memory segment to the volatile memory portion according to the layout address table. Upon retrieval of the first memory segment from the backup disk, the memory segment is restored to the volatile memory portion, such as RAM. The restoration is made possible with reference to the layout address table established (step S255) and maintained (step S275) according to embodiments of the present invention.

Some embodiments of the present invention operate by splitting the VMA sections into heterogeneous memory, moving the text, debug, and immutable content section areas of the VMA into volatile memory, (backed up by disk). In that way reliability is maintained by re-creating the memory state, or storage image, from NVDIMM data and backup disk image. It should be noted that for non-uniform memory access (NUMA), inside the binary access, data access has a different latency compared to instructions access. The data cache and/or instruction cache may have different topologies.

Some embodiments of the present invention operate such that performing workloads that are not data intense is similar to the performance of RAM while maintaining the reliability of NVDIMM storage.

Figure 4:
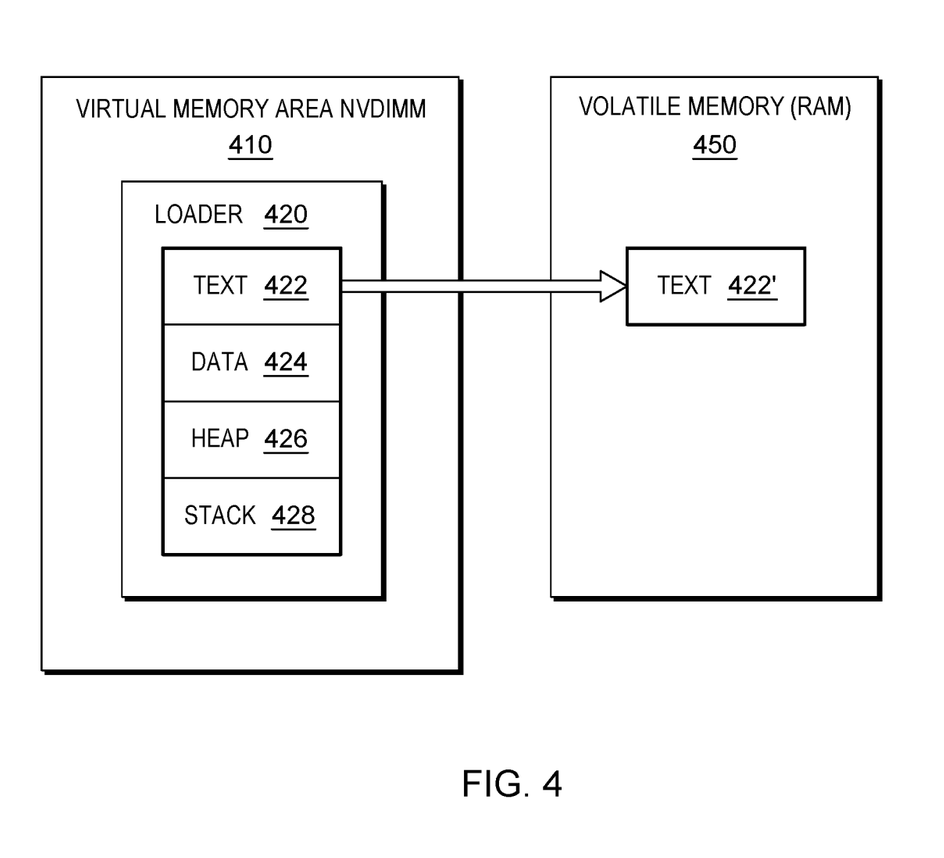
FIG. 4 is a data structure view showing information that is generated by and/or helpful in understanding embodiments of the present invention.

Referring now to FIG. 4, virtual memory area of NVDIMM 410 has loader mechanism 420, which includes the following memory segment types: text segment 422 (executable instruction, read-only); data segment 424 (initialized data); heap segment 426 (dynamic memory allocation by malloc( ) function, which allocates requested memory and returns a pointer to the allocated memory location); and stack segment 428 (such as local variables function parameters and return address).

Any application having a loader mechanism, such as Docker, may operate according to aspects of the present invention. One example use case is where virtual machine technology, such as Linux Containers or a hypervisor, take advantage of the split loading mechanism taught by aspects of the present invention. Another use case is where an existing operational system loader mechanism, such as Linux, is modified to leverage the benefits of a split-loading mechanism taught by some embodiments of the present invention. (Note: the term(s) "DOCKER" and/or "LINUX" may be subject to trademark rights in various jurisdictions throughout the world and are used here only in reference to the products or services properly denominated by the marks to the extent that such trademark rights may exist.)

As shown in FIG. 3 is a system view of a system enabling some embodiments of the present invention. A dedicated section at NVDIMM space 410 stores layout address table 520. It should be noted that an application that was developed using address space layout randomization (ASLR) would typically need to be re-mapped when the virtual memory area is to be re-constructed. Non-executable sections of memory, such as data, are preserved when practicing aspects of the present invention.

Certain memory segments in the VMA of NVDIMM such as text segment 422 are moved to volatile memory (RAM) as text segment 422'. Some embodiments of the present invention deploy a program loader to create two memory regions, one memory region created in NVDIMM memory 410, including data segment 424, and the other memory region created in volatile RAM memory 450, including text segment 422'. When the process is loaded, either the NVDIMM memory region or the volatile RAM memory region is mapped through a lazy allocator policy with reference to layout address table 520. A lazy allocator policy means that the memory space is reserved dynamically when the system needs to reclaim physical memory instead of having to allocate it in advance for every page of anonymous memory.

Figure 5:
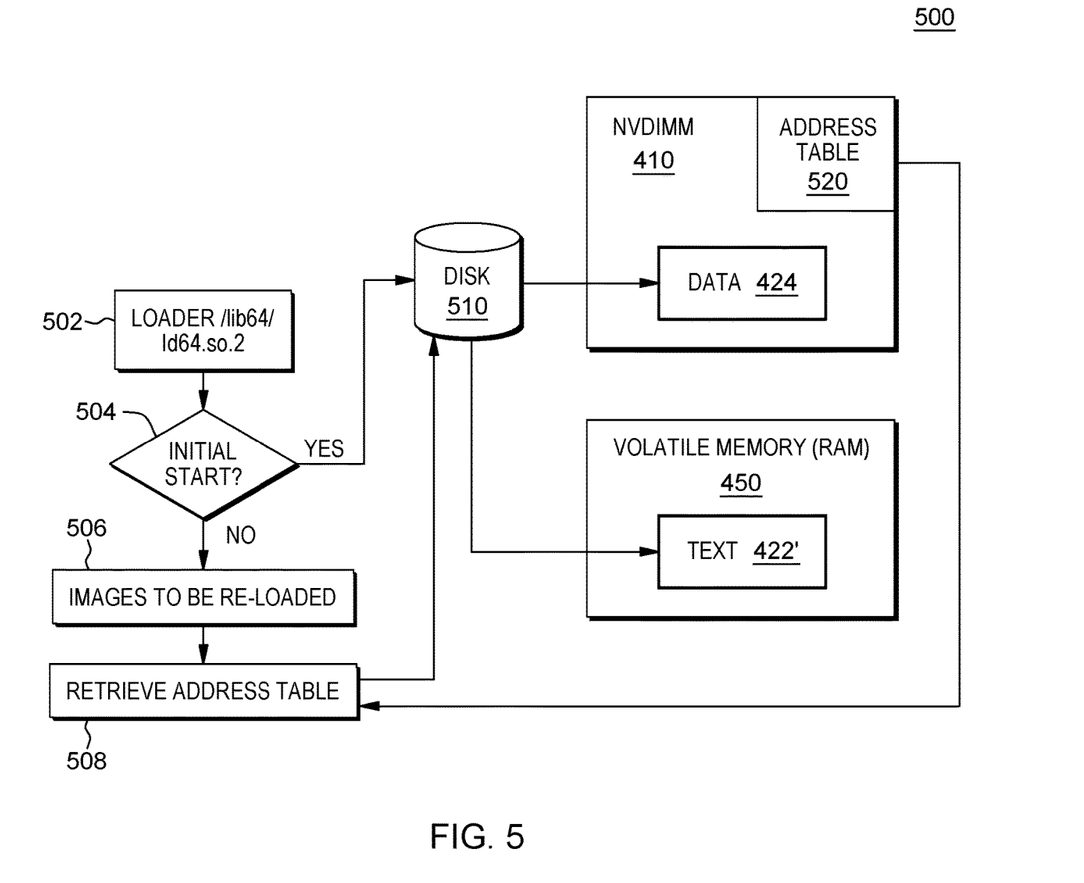
FIG. 5 is a system diagram view of a second embodiment of a system according to the present invention.

According to the system flow depicted in FIG. 5, processing begins at step 502, where a loader mechanism loads a data section associated with the VMA into NVDIMM memory space and a text section associated with the process into the RAM. As shown in FIG. 4, data section 424 is in NVDIMM 410 and text section 422 is loaded into RAM as text section 422'.

Processing proceeds to step 504 where the initial start follows the "yes" branch to initialize backup disk 510 or follows the "no" branch to step 506, depending on whether execution is just starting or a restoration is required.

Following the "no" branch, processing proceeds to step 506 where images are to be re-loaded to RAM.

Processing proceeds to step 508 where address table 520 is retrieved and backup disk 510 accesses data segment 424 in NVDIMM 410 to reload images to RAM.

Some embodiments of the present invention load the various segment types of process virtual address space into one of the two memory regions. Loading the segments of the process virtual address space may be directed by governing policy, user-preference, or otherwise according to a scheme that best suits the objective for making storage decisions. According to some embodiments of the present invention, the segment type that stores data is loaded into the NVDIMM memory space. The text-type segment, debug-type segment, and immutable content-type segments are loaded into the volatile RAM memory space. In this example, the data segment is loaded, or recorded, only at execution, through a page fault that causes a write, or read for volatile memory locations, to the destination memory. This mechanism improves computer system performance by not wasting computing time with loading a memory region, or segment, into volatile RAM memory space that will not be effectively used. In this case, the virtual memory address table maps the RAM memory space and the NVDIMM memory space.

When an unexpected reset occurs, the content of the volatile RAM memory will be retrieved from backup disk and stored in the same place that was used prior to the reset event, while respecting the ASLR mechanism. Unexpected resets may occur for several reasons including a power outage, insufficient computing resources, and/or configuration errors. Since the NVDIMM does not lose its content during an unexpected reset, once the RAM memory content is re-loaded, the application can resume from the previous instruction pointer. It should be noted that the ASLR would need to be restored to address the other parts of memory that are stored on RAM, not on NVDIMM.

Some embodiments of the present invention are directed to a computer-implemented process for managing virtual memory, the computer-implemented process comprising: (i) creating, for a process by a computer, memory regions representing a process virtual address space comprising memory segments of type: Text, Data, Heap, Stack, and Shared (SHM) memory in heterogeneous memory comprising a first region using NVDIMM memory including a Virtual Memory Area (VMA) address table and a second region using RAM; (ii) in response to process execution, loading a data section associated with the process, by the computer, into the NVDIMM memory space, wherein data associated with the process is loaded using a page fault causing one of a write or a read of memory; (iii) loading, by the computer, text, debug, and immutable content associated with the process into the RAM; and (iv) updating, by the computer, the Virtual Memory Area (VMA) address table maintained in the NVDIMM that maps what is RAM memory space and NVDIMM memory space, for subsequent use on an unexpected reset.

Some embodiments of the present invention do more that divide a memory space or region to dram and non-volatile memory for mapping or transferring data during unexpected reset or power failure. Some embodiments of the present invention are directed to more than enhancing NVDIMM memory performance.

Some embodiments of the present invention are directed to a split virtual memory space loading scenario in NVDIMM memory space.

Some embodiments of the present invention are directed to loading the Text section of virtual memory space into volatile memory (RAM) and the data section of virtual memory space as heap and stack into NVDIMM.

Some embodiments of the present invention are directed to NV-DIMM process allocation.

Some embodiments of the present invention are directed to splitting the VMA to maintain reliability.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for managing virtual address space comprising:
   determining a set of storage requirements for a process performed by an application;
   establishing a set of memory regions representing a process virtual address space where a first memory region uses a non-volatile portion of a non-volatile dual in-line memory module (NUDISM) memory including a virtual memory area address table and a second memory region uses volatile memory;
   assigning a memory classification to each of a plurality of memory segments required by the process such that each of the plurality of memory segments storing executable instructions is classified as a text memory segment, and each of the plurality of memory segments storing initialized data is classified as a data memory segment;
   determining an allocation scheme for the process virtual address space, according to the set of storage requirements for the process, the allocation scheme determined according to the plurality of memory segments and based on the memory classification of the plurality of memory segments, the set of storage requirements requiring data memory segments to be stored in the first memory region and requiring text memory segments to be stored in the second memory region;
   responsive to execution of the process, loading a data memory segment of the plurality of memory segments into the first memory region, the data memory segment loaded through a page fault;
   allocating a text memory segment of the plurality of memory segments to the second memory region according to the allocation scheme; and
   updating the virtual memory area address table to associate the first memory segment with the second memory region.

2. The computer-implemented method of claim 1, further comprising:
   backing up the first memory segment to a backup disk;
   responsive to a reset condition, retrieving the first memory segment from the backup disk;
   storing the first memory segment to the volatile memory according to the virtual memory area address table; and
   resuming the process from an instruction pointer placed prior in time to the reset condition.

3. The computer-implemented method of claim 1, wherein the volatile memory is a RAM.

4. The computer-implemented method of claim 1, further comprising:
   determining a computing storage requirement for a process container;
   wherein:
   the memory segments required by the process are based on the determined computing storage requirements.

5. A computer system for managing virtual address space, the computer system comprising:
   a processor set; and
   a computer readable storage medium;
   wherein:
   the processor set is structured, located, connected, and/or programmed to run program instructions stored on the computer readable storage medium; and
   the program instructions include:
      program instructions programmed to determine a set of storage requirements for a process performed by an application;
      program instructions programmed to establish a set of memory regions representing a process virtual address space where a first memory region uses a non-volatile portion of a non-volatile dual in-line memory module (NVDIMM) memory including a virtual memory area address table and a second memory region uses volatile memory;
      program instructions programmed to assign a memory classification to each of a plurality of memory segments required by the process such that each of the plurality of memory segments storing executable instructions is classified as a text memory segment, and each of the plurality of memory segments storing initialized data is classified as a data memory segment;
      program instructions programmed to determine an allocation scheme for the process virtual address space, according to the set of storage requirements for the process, the allocation scheme determined according to the plurality of memory segments and based on the memory classification of the plurality of memory segments, the set of storage requirements requiring data memory segments to be stored in the first memory region and requiring text memory segments to be stored in the second memory region;
      program instructions programmed to, responsive to execution of the process, load a data memory segment of the plurality of memory segments into the first memory region, the data memory segment loaded through a page fault;
      program instructions programmed to allocate a text memory segment of the plurality of memory segments to the second memory region according to the allocation scheme; and
      program instructions programmed to update the virtual memory area address table to associate the first memory segment with the second memory region.

6. The computer system of claim 5, the program instructions further including:
   program instructions programmed to back up the first memory segment to a backup disk;
   program instructions programmed to, responsive to a reset condition, retrieve the first memory segment from the backup disk;
   program instructions programmed to store the first memory segment to the volatile memory according to the virtual memory area address table; and
   program instructions programmed to resume the process from an instruction pointer placed prior in time to the reset condition.

7. The computer system of claim 5, wherein the volatile memory is a RAM.

8. The computer system of claim 5, the program instructions further including:
   program instructions programmed to determine a computing storage requirement for a process container;
   wherein:
   the memory segments required by the process are based on the determined computing storage requirements.

* * * * *